United States Patent
Yao et al.

(10) Patent No.: US 12,432,783 B2
(45) Date of Patent: Sep. 30, 2025

(54) PHYSICAL RANDOM ACCESS CHANNEL ENHANCEMENTS IN NEW RADIO

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Hong He, Cupertino, CA (US); Huaning Niu, San Jose, CA (US); Seyed Ali Akbar Fakoorian, San Diego, CA (US); Sigen Ye, San Diego, CA (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 17/914,197

(22) PCT Filed: Oct. 28, 2021

(86) PCT No.: PCT/CN2021/127036
§ 371 (c)(1),
(2) Date: Sep. 23, 2022

(87) PCT Pub. No.: WO2023/070436
PCT Pub. Date: May 4, 2023

(65) Prior Publication Data
US 2024/0015795 A1    Jan. 11, 2024

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
None
See application file for complete search history.

(56) References Cited

U.S. PATENT DOCUMENTS

2015/0341950 A1\* 11/2015 Pang ................. H04W 74/0833
370/329
2018/0152904 A1\* 5/2018 Xirouchakis ..... H04W 56/0045
(Continued)

FOREIGN PATENT DOCUMENTS

CN        111279784        6/2020
CN        111867084        10/2020
(Continued)

OTHER PUBLICATIONS

International Search Report and Written Opinion for PCT Patent Application No. PCT/CN2021/127036; 9 pages; Apr. 25, 2022.
(Continued)

*Primary Examiner* — Clemence S Han
(74) *Attorney, Agent, or Firm* — Kowert, Hood, Munyon, Rankin & Goetzel, P.C.

(57) ABSTRACT

A UE may transmit a message comprising information regarding one or more physical random access channel (PRACH) capabilities of the UE to a base station (BS). The UE may then receive, from the BS, signaling comprising an indication of one or more configured PRACH formats supporting the one or more PRACH capabilities. Next, the UE may transmit, using the one or more configured PRACH formats, one or more preambles to the BS in a random access (RACH) procedure. Accordingly, the UE may receive a random access response (RAR) from the base station and further, in response to receiving the RAR, establish a connection with the BS.

20 Claims, 9 Drawing Sheets

(56) References Cited

U.S. PATENT DOCUMENTS

| | | | |
|---|---|---|---|
| 2019/0044782 A1* | 2/2019 | Zeng | H04L 27/2613 |
| 2019/0059112 A1* | 2/2019 | Ou | H04W 74/0833 |
| 2019/0320430 A1* | 10/2019 | Kim | H04L 27/26132 |
| 2020/0187237 A1* | 6/2020 | Su | H04L 1/1896 |
| 2020/0383167 A1* | 12/2020 | Sengupta | H04W 76/19 |
| 2021/0058971 A1* | 2/2021 | MolavianJazi | H04B 17/318 |
| 2021/0266972 A1 | 8/2021 | Taherzadeh Boroujeni | |
| 2022/0338272 A1* | 10/2022 | Ohara | H04W 74/0866 |
| 2022/0408489 A1* | 12/2022 | Harada | H04L 27/26025 |
| 2023/0009307 A1* | 1/2023 | Fang | H04W 72/0453 |
| 2023/0023821 A1* | 1/2023 | Harada | H04L 27/2613 |
| 2023/0054655 A1* | 2/2023 | Sedin | H04W 74/0838 |
| 2023/0156818 A1* | 5/2023 | Wang | H04W 74/0866 |
| | | | 370/329 |
| 2024/0057031 A1* | 2/2024 | Okamura | H04W 4/02 |
| 2024/0172272 A1* | 5/2024 | Xiong | H04L 1/189 |
| 2024/0298358 A1* | 9/2024 | Ohara | H04W 74/006 |

FOREIGN PATENT DOCUMENTS

| | | |
|---|---|---|
| CN | 112534860 | 3/2021 |
| EP | 3780871 | 2/2021 |

OTHER PUBLICATIONS

NTT DOCOMO, Inc. "Summary on UE features for two-step RACH"; 3GPP TSG RAN WG1 #1000bis-e R1-2002453; 16 pages; Apr. 9, 2020.
Supplementary Extended European Search Report for EP 21961802. 2; Jul. 21, 2025.

* cited by examiner

PHYSICAL RANDOM ACCESS CHANNEL ENHANCEMENTS IN NEW RADIO

PRIORITY CLAIM

This application is a national phase entry of PCT application number PCT/CN2021/127036, entitled "Physical Random Access Channel Enhancements in New Radio," filed Oct. 28, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for Physical Random Access Channel (PRACH) enhancements in New Radio.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies. Accordingly, improvements in the field in support of such development and design are desired.

SUMMARY

Embodiments relate to apparatuses, systems, and methods for Physical Random Access Channel (PRACH) enhancements in New Radio.

According to some embodiments, a UE may transmit a message comprising information regarding one or more physical random access channel (PRACH) capabilities of the UE to a base station (BS). The UE may then receive, from the BS, signaling comprising an indication of one or more configured PRACH formats supporting the one or more PRACH capabilities. Next, the UE may transmit, using the one or more configured PRACH formats, one or more preambles to the BS in a random access (RACH) procedure. Accordingly, the UE may receive a random access response (RAR) from the base station and further, in response to receiving the RAR, establish a connection with the BS.

In some embodiments, the one or more PRACH capabilities may include at least one of PRACH repetition, PRACH frequency hopping, or PRACH beam sweeping. According to some embodiments, there may be a one to multiple or multiple to one mapping between synchronization signal blocks (SSBs) and RACH occasions (ROs). Additionally or alternatively, a first message (MsgA) may include the one or more preambles and one or more physical uplink shared channel (PUSCH) transmissions. According to some embodiments, the number of MsgA preambles may be configured separately from the MsgA PUSCH repetitions. Additionally or alternatively, the offset between a first MsgA PUSCH of the one or more PUSCH transmissions and a last MsgA preamble of the one or more preambles may be configured by the base station. According to some embodiments, the MsgA may be transmitted as a whole channel structure. In some embodiments, the UE may be further configured to determine a RAR window using one or more random access-radio network temporary identifiers (RA-RNTIs).

According to some embodiments, the one or more preambles may be transmitted at a maximum power level. Additionally or alternatively, the one or more preambles may be transmitted at increasing power levels. In some embodiments, a starting subframe periodicity of the one or more preambles may be greater than or equal to the number of the one or more preambles. Additionally or alternatively, the UE may configure a reference signal received power (RSRP) threshold for selecting PRACH resources for repetition. In some embodiments, the one or more PRACH formats may include PRACH format B4 and a predefined number of PRACH repetitions may be indicated by a system information block 1 (SIB1).

According to further embodiments, the UE may be configured for PRACH frequency hopping in at least one of a configured frequency region and configured bandwidth part (BWP), wherein a frequency hopping offset may be indicated in the one or more preambles. Additionally or alternatively, a frequency hopping time interval or pattern may be configured based on at least one of a per-slot basis, a per-subframe basis, a per-radio frame basis, and a per-half PRACH repetition basis.

In some embodiments, the UE may be configured to determine a number of beams to be swept based on one or more synchronization signal block (SSB) reference signal received power (RSRP) measurements. Additionally or alternatively, there may be a multiple to one mapping between synchronization signal blocks (SSBs) and RACH occasions (ROs) wherein one or more beams are swept in an associated period or an associated pattern period.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
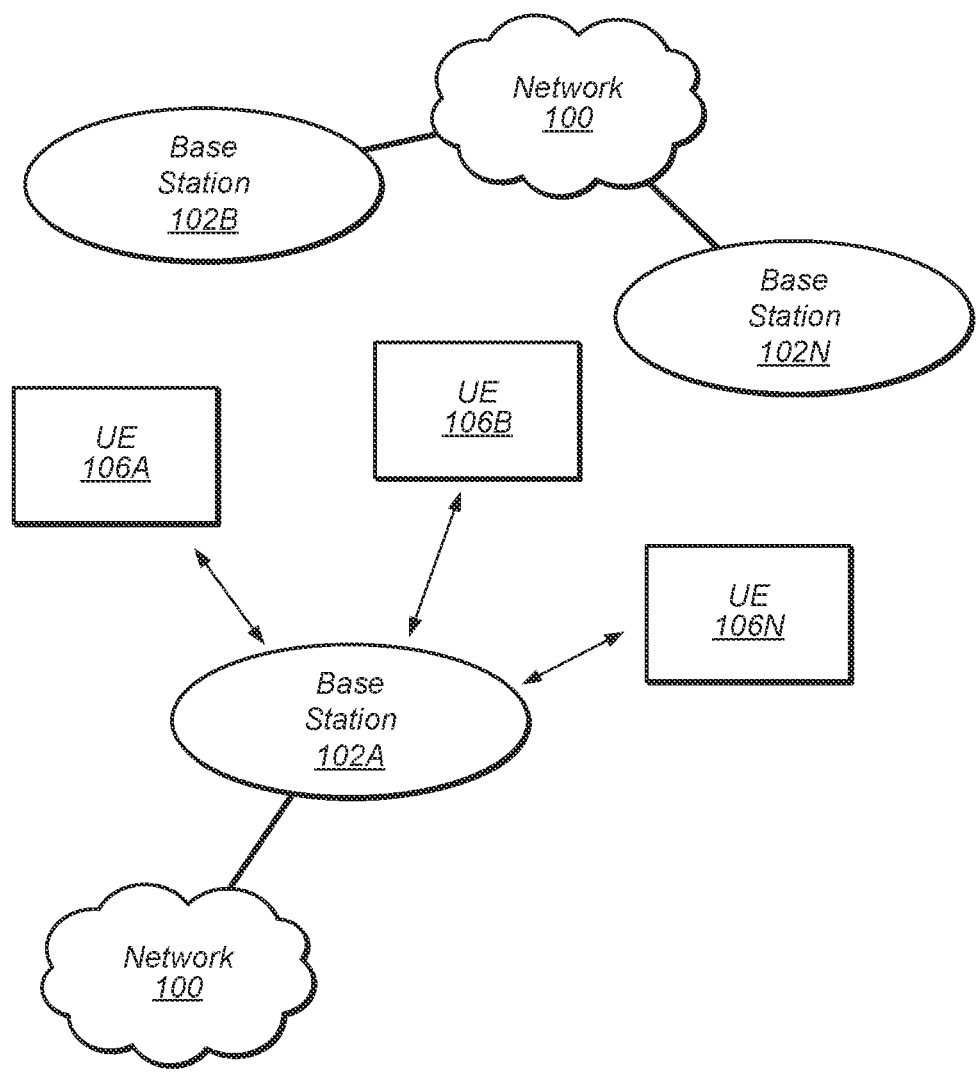
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
ITS: Intelligent Transportation System
RRC: Radio Resource Control
RACH: Random Access Channel
PRACH: Physical Random Access Channel
FR2: Frequency Range 2
RAR: Random Access Response
RA-RNTI: Random Access—Radio Network Temporary Identifier
RLC: Radio Link Control
RSRP: Reference Signal Received Power
NW: Network
NAS: Non-Access Stratum
SIB1: System Information Block-1
SSB: Synchronization Signal Block
RO: RACH Occasion
TDM: Time Division Multiplexing
FDM: Frequency Division Multiplexing
SFN: System Frame Number
CFRA: Contention Free Random Access
PDCCH: Physical Downlink Control Channel
PUSCH: Physical Uplink Shared Channel
BWP: Bandwidth Part
RB: Resource Block
CG: Configured Grant
DG: Dynamic Grant
PDCP: Packet Data Convergence Protocol Terms The following is a glossary of terms used in this disclosure: Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element - includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
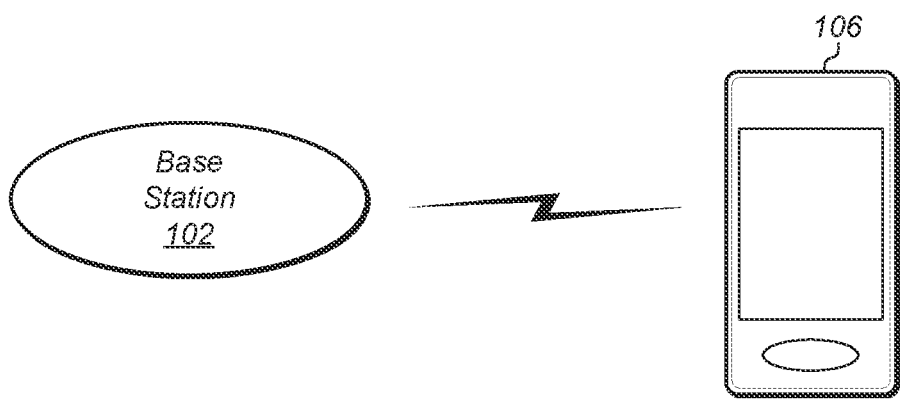
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTTor LTE or GSM), and separate radios for communicating using each of Wi-Fi and Bluetooth. Other configurations are also possible.

Figure 3:
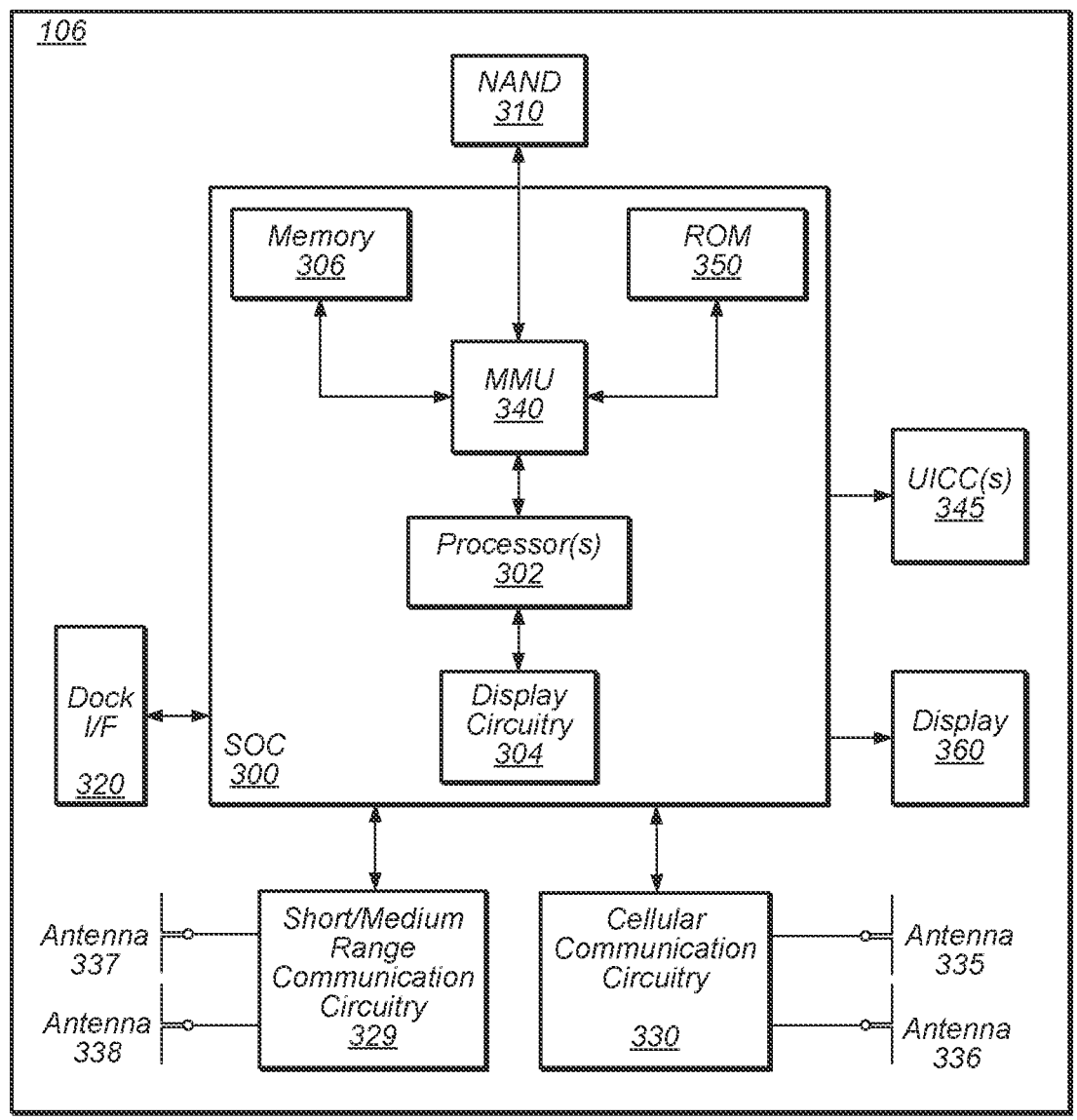
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
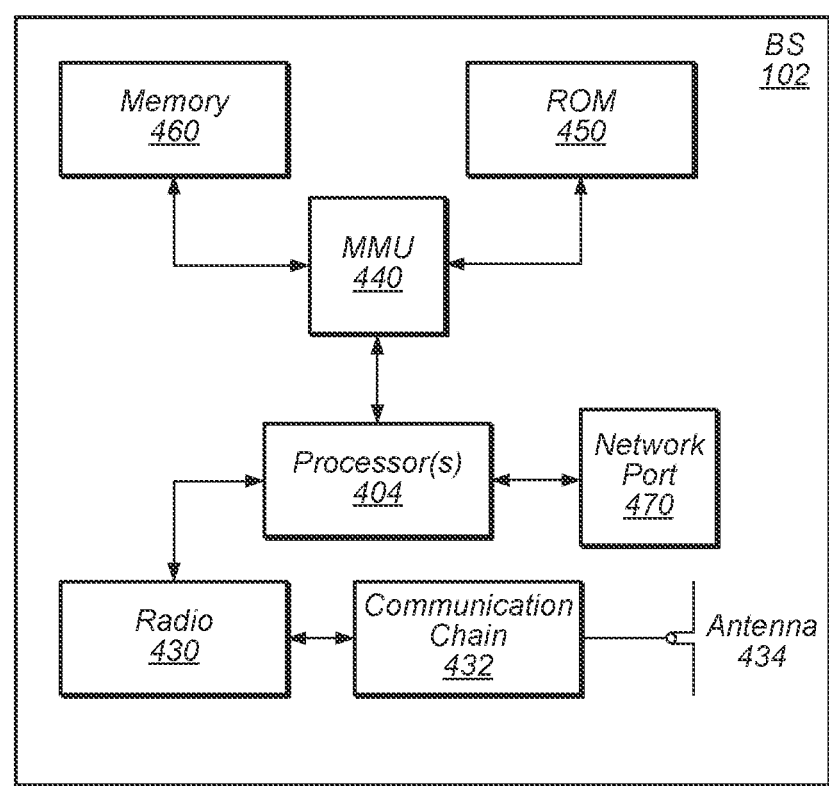
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
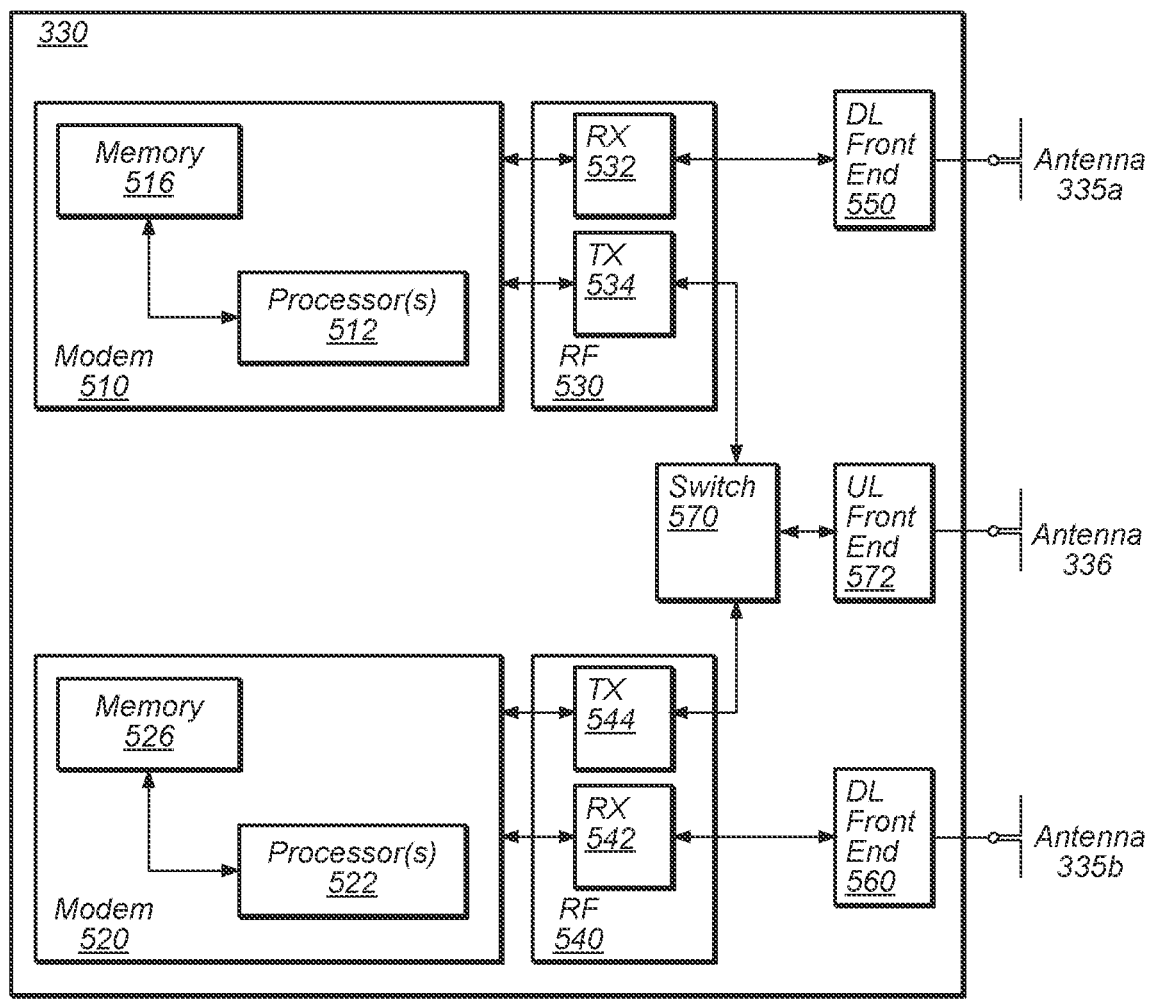
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-standalone (NSA) Operation with LTE

Figure 6A:
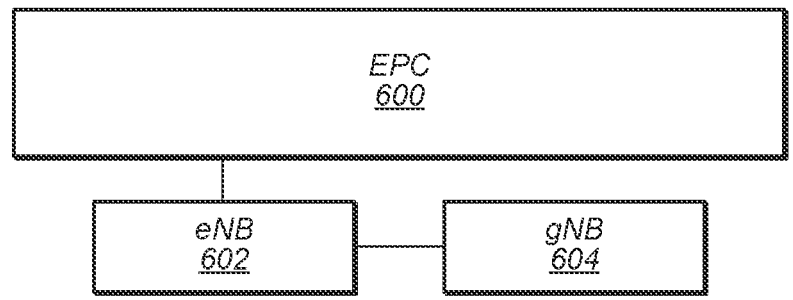
FIG. 6A illustrates an example of connections between an EPC network, an LTE base station (eNB), and a 5G NR base station (gNB), according to some embodiments.
Figure 6B:
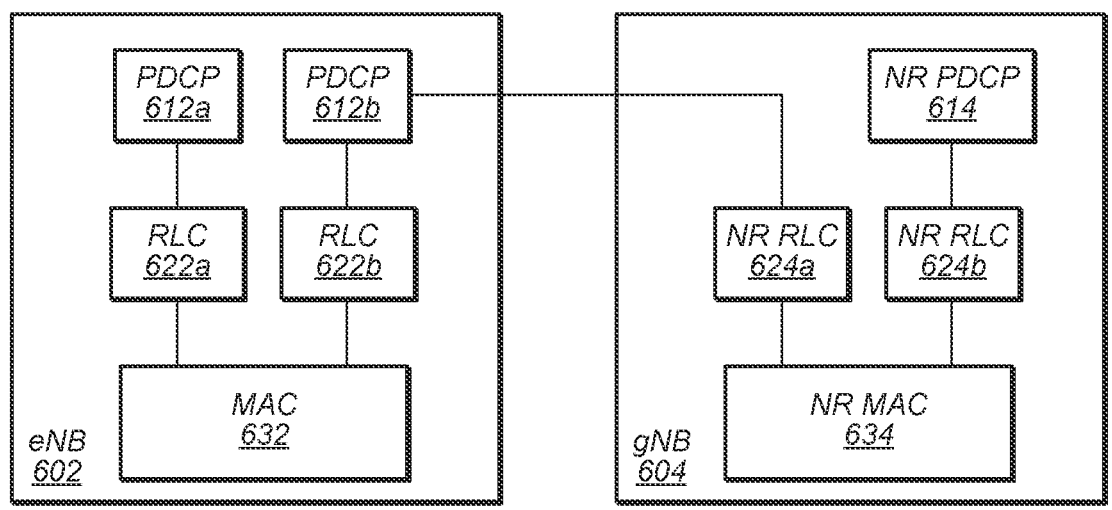
FIG. 6B illustrates an example of a protocol stack for an eNB and a gNB, according to some embodiments.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

NR Preamble

The physical random access channel (PRACH) may be used to carry random access preambles, which may be used for initiation of a random access procedure. In the frequency domain, several subcarriers at both ends of the, e.g., 6, physical resource blocks (PRBs) may not be used to avoid interference with adjacent channels (e.g., PUCCH and/or PUSCH). In the time domain, the cyclic prefix (CP) and guard time (GT) may be used to avoid interference with the previous and next subframes. In some embodiments, the GT may be related to the maximum cell radius. A random access preamble may include a sequence, a CP, and a GT. The sequence, CP, and GT may be defined in Ts (e.g., the basic time unit of the standard, which may be specified as a set number of nanoseconds, such as 32.552 ns) and/or in ms. NR supports scaled PRACH (physical random access channel) numerology. In addition, although increasing subcarrier spacing (SCS) can increase the peak power, it may also reduce the symbol/RACH duration, which may reduce the overall time of the signal transmission.

In some embodiments, the RACH preambles may be interlaced with sounding reference signals (e.g., SRS) in the frequency domain. Accordingly, RACH preambles and SRS may be FDM (frequency-domain multiplexed) together within the same allocation of time-frequency resources. Additionally, instead of using code domain multiplexing (e.g., applicable to the licensed frequency range), frequency domain multiplexing (FDM) may be used. Thus, different groups of PRACH resources may be frequency domain multiplexed. Moreover, within each group, PRACH resources can be further differentiated using CDM. For example, different sequences may be used according to CDM, e.g., cyclic shift of the same ZC sequence in frequency domain.

In some embodiments, the preamble may be transmitted a plurality of times to the base station. Note that this ability to transmit a plurality of times to the base station may be more than was possible using prior methods (e.g., only a single transmission may have been previously possible). For example, the repetition of the RACH preamble may be at a symbol-level, multiple-symbol-level, or segment-level (e.g., this segment could be 2 or 6 symbols). In some embodiments, the repetition factor could be similar order of the interlacing factor M. The overall RACH preamble (including repetition) length can be variable, targeting different cell sizes, and these parameters (including repetition factor) may be configured by the network (or BS) accordingly.

Note that the configuration of the preamble may be configured by the BS. For example, the BS may transmit configuration information that specifies the value of M, the value of u, (e.g., subcarrier spacing) and/or the number of repetitions of the preamble, among other parameters. In one embodiment, the UE may decode this information (e.g., from a broadcast channel, such as while decoding master information blocks (MIBs) or system information blocks (SIBs) prior to transmitting the preamble to the base station. The UE may then transmit the PRACH according to the parameters specified by the information.

In some embodiments, e.g., in NR, PRACH enhancements may include multiple PRACH transmissions using the same beam, multiple PRACH transmissions using different beams, and PRACH enhancements using one or more finer (e.g., narrower) beams. Additionally, further coverage enhancements including PRACH enhancement for frequency range 2 (FR2) involving PRACH repetition using the same or different beams are envisioned.

Figure 7:
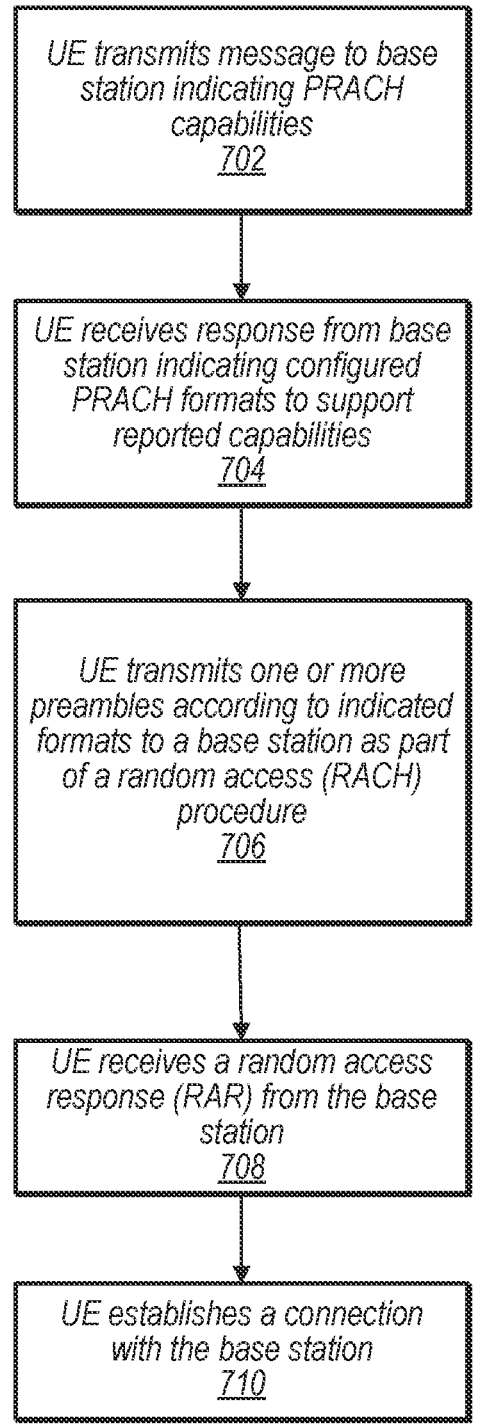
FIG. 7 is a flowchart diagram illustrating an exemplary method for enhanced physical random access channel (PRACH) capabilities, according to some embodiments.

FIG. 7—Method of Enhanced PRACH Procedures in New Radio (NR)

FIG. 7 illustrates an example flow chart corresponding to a method of enhanced PRACH procedures in New Radio (NR), according to some embodiments.

Aspects of the method of FIG. 7 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 702, the UE may transmit a message reporting a capability of PRACH repetition, frequency hopping, and/or beam sweeping to a base station. For example, the UE may indicate to the base station that it supports a PRACH repetition capability in which one or more preambles are transmitted at multiple RACH occasions (ROs). Additionally or alternatively, the UE may indicate that it supports capabilities of PRACH frequency hopping and/or PRACH beam sweeping. The UE may indicate these one or more enhanced PRACH capabilities via signaling including a report or indication. For example, the UE may indicate to the base station that it is configured to perform reference signal received power (RSRP) measurements for selecting PRACH resources for repetition, according to some embodiments. Additionally or alternatively, the UE may indicate to the base station that it supports PRACH beam sweeping in which it can use RSRP measurements to determine which uplink beams (and neighboring beams) are to be swept. According to some embodiments, the UE may indicate via the message that it supports performing PRACH frequency hopping corresponding to a frequency hopping time interval or pattern.

In 704, the UE may receive a response from the base station indicating configured PRACH formats to support the UE's reported PRACH capabilities. In other words, the base station may utilize the information received in 702 from the UE in order to accommodate the UE's enhanced PRACH capabilities. For example, the base station may, in response to receiving the indication of the UE's PRACH capability, configure certain PRACH formats for the UE to utilize and transmit a response indicating said formats.

In 706, the UE may transmit one or more preambles, using at least one of the one or more reported capabilities and one or more PRACH formats, to a base station as part of a random access (RACH) procedure. In some embodiments, the UE may transmit the one or more preambles as part of a random access procedure in a random access channel (RACH) (e.g., a physical RACH (PRACH)). Additionally or alternatively, the RACH procedure may involve combining the one or more preambles with one or more scheduled PUSCH transmissions into a single or first message (MsgA) from the UE. In other words, a first message (MsgA) may include a PRACH preamble and a PUSCH transmission (e.g., MsgA PRACH and MsgA PUSCH respectively). The MsgA PRACH preambles may be transmitted in RACH/PRACH Occasions (ROs) and the PUSCH transmissions may be transmitted in PUSCH Occasions (POs) which may span multiple symbols and physical resource blocks PRBs including optional guard periods and guard bands between consecutive POs, according to some embodiments. Accordingly, having received an indication of supported PRACH formats from the base station, the UE may be able to utilize this information in order to perform certain enhanced PRACH capabilities such as PRACH repetition, PRACH frequency hopping and/or PRACH beam sweeping as part of a RACH procedure.

In 708, in response to transmitting the one or more preambles using enhanced PRACH capabilities, the UE may further receive a random access response (RAR) from the base station. In other words, after the UE transmits the one or more preambles (e.g., including MsgA), the UE may wait for a response from the base station (e.g., MsgB). For example, the base station may detect or receive the one or more preambles as part of the MsgA and upon successful decoding of the MsgA PUSCH, the base station may transmit back a random access response (RAR) to the UE indicating said successful reception and decoding of the MsgA. For example, if the base station detects the MsgA and successfully decodes the MsgA PUSCH from the UE, the base station may send back a "successRAR" message to the UE with a contention resolution ID of MsgA. In other words, the response from the base station (e.g., MsgB) may include the random-access response and the contention-resolution message.

In some embodiments, if the base station doesn't detect the MsgA PRACH, a response may not be sent back to the UE. Accordingly, the UE may optionally retransmit the MsgA or perform a fallback four-step RACH procedure. Additionally or alternatively, if the base station detects the MsgA preamble but fails to successfully decode the MsgA PUSCH from the UE, the base station may transmit back a response to the UE indicating the failed decoding attempt and further include a RAPID (random-access preamble ID) and an uplink grant for a MsgA PUSCH retransmission. Accordingly, upon receiving the fallbackRAR, the UE may fall back to four-step RACH with a transmission of Msg3 (retransmission of the MsgA PUSCH).

In 710, in response to receiving the random access response from the base station, the UE may establish a connection (e.g., an RRC connection) with the base station. Accordingly, the UE may be considered to be in an RRC_Connected state and perform further communications with the base station.

Figure 8A:
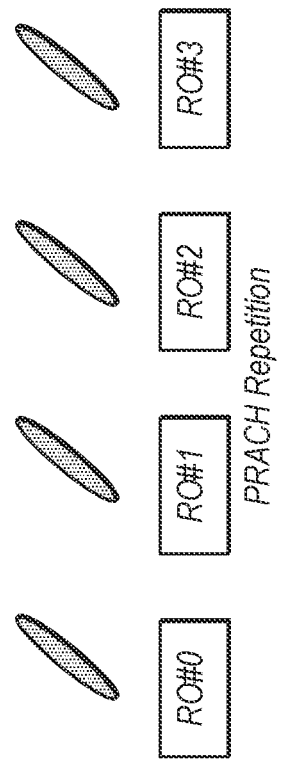
FIG. 8A illustrates an example of PRACH repetition events across multiple RACH occasions (ROs), according to some embodiments.

FIG. 8A—PRACH Repetition Events Across Multiple RACH Occasions (ROs) for a Single Beam FIG. 8A illustrates an example of PRACH repetition events across multiple RACH occasions (ROs), according to some embodiments. For example, initially the UE may report the capability of PRACH repetition and/or PRACH frequency hopping to the base station (e.g., gNB). Accordingly, the base station may then configure one or more PRACH formats to support said PRACH repetition.

According to some embodiments, the PRACH may repeated for the same SSB in a time division multiplexed (TDM) manner and the PRACH resource partition may be associated with a synchronization signal block—RACH occasion (SSB-RO). In some embodiments, PRACH may be repeated such that there is a one to multiple mapping between SSBs and ROs. For example, if mapping ROs are time division multiplexed (TDM), dedicated ROs (and associated preambles in the ROs) may be assigned for PRACH repetition, according to some embodiments. Additionally or alternatively, if mapping ROs are frequency division multiplexed (FDM), dedicated preambles in one RO (the RO which may be shared or dedicated) may be assigned for PRACH repetition. In some embodiments, PRACH may be repeated such that there is a multiple to one mapping between SSBs and ROs. For example, dedicated preambles may be utilized in a RO for PRACH repetition. Furthermore, PRACH repetition may be configured to support contention-based preambles as well as non-contention-based preambles, according to some embodiments.

FIG. 8A illustrates multiple ROs (RO#0, RO#1, RO#2, and RO#3) which may be utilized in performing PRACH repetition as part of a RACH procedure. For example, upon transmitting the one or more preambles as part of the MsgA PRACH, the base station may fail to detect or decode the MsgA PUSCH. Accordingly, the UE may attempt to retransmit (e.g., perform PRACH repetition) at the next RO such as RO#1. Moreover, if the base station fails to transmit a successful RAR message to the UE, the UE may subsequently use RO#2 and RO#3 to repeat the PRACH transmissions in order to successfully advance the RACH procedure. According to some embodiments, the UE may be able to utilize certain power control techniques for PRACH repetition. For example, if PRACH repetition is being utilized, a maximum transmission power may be applied for the PRACH such that the PRACH repetitions are transmitted at a specific or designated power. Additionally or alternatively, power ramping may be applied to the PRACH repetitions such that the power of the PRACH repetition transmissions are gradually increased from RO#0 to RO#3 (or subsequent ROs).

In some embodiments, the base station may configure the one or more PRACH formats to be PRACH format B4. Furthermore, a reference signal received power (RSRP) threshold may be configured for PRACH repetition selection, according to some embodiments. For example, if the UE measured synchronization signal block (SSB) RSRP is lower than a configured threshold, the UE may select the PRACH resources for repetition. In other words, due to a reduced signal strength the UE may utilize PRACH repetition in order to mitigate transmission issues or reception failures.

Furthermore, the number of PRACH repetitions may be indicated by a system information block (SIB) such as SIB1, according to some embodiments. Additionally or alternatively, a pre-defined set of number of repetitions may be characterized by a parameter such as prach-RepetitionNumber, according to some embodiments. For example, prach-RepetitionNumber may further characterize the number of repetitions to be a within a set of $\{1, 2, 4, 8, 16\}$. Additionally or alternatively, PRACH repetition may be configured such that repetitions may occur at predefined PRACH occasions using a parameter such as prach-ConfigurationIndex.

Figure 8B:
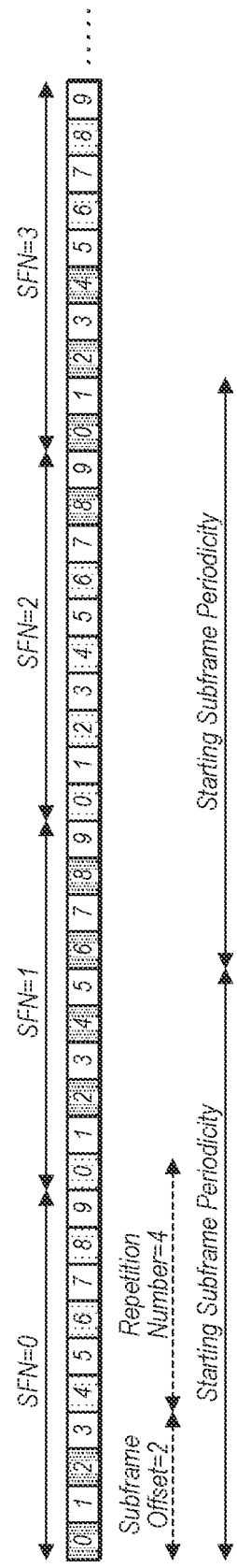
FIG. 8B illustrates an example of PRACH repetition events across multiple system frame numbers (SFNs), according to some embodiments.

FIG. 8B—PRACH Repetition Events Across Multiple System Frame Numbers (SFNs)

FIG. 8B illustrates an example of PRACH repetition events across multiple system frame numbers (SFNs), according to some embodiments. For example, FIG. 8B illustrates SFN=0, SFN=1, SFN=2, and SFN=3 being utilized for PRACH repetition. Additionally, FIG. 8B illustrates ROs which are used for PRACH repetition as well as ROs which are not used for repetition. For example, for a repetition number of four, FIG. 8B illustrates four PRACH ROs used for repetition (4, 6, 8, 0) between SFN=0 and SFN=1. Additionally, FIG. 8 illustrates a subframe offset of two which corresponds to SFN=1 ROs (2, 4, 6, and 8) which are not used for repetition. Accordingly, this PRACH repetition pattern may be continued through SFN=2 and SFN=3 according to these configured parameters. Furthermore, a starting subframe periodicity may be characterized by a parameter such as prach-StartingSubframePeriodicity which may specify the starting subframe as $\{1, 2, 4, 8, 16, 32, 64, 128, 256\}$. Additionally or alternatively, the PRACH starting subframe periodicity may be larger than or equal to the number of PRACH repetitions, according to some embodiments. For example, if there are two preambles in the first message (MsgA), then the corresponding starting subframe periodicity may be at least two.

In some embodiments, the starting subframe offset may be expressed in terms of PRACH opportunities and may be characterized by a parameter such as prach-StartingSubframeOffset, where prach-StartingSubframeOffset may be less than or equal to a parameter characterizing the number of PRACH repetitions such as prach-RepetitionNumber According to some embodiments, the PRACH starting subframe may be characterized by the equation Mprach-StartingSubframePeriodicity+prach-StartingSubframeOffset, where N=$\{0, \ldots\}$. According to some embodiments, a PRACH time-domain resource configuration may be characterized by a parameter such as prach-ConfigurationIndex. Additionally or alternatively, the PRACH repetition pattern may be re-started after 1024 radio frames, the PRACH occasion in the last starting subframe periodicity is transmitted, and/or if the repetition number is smaller than the configured number, according to some embodiments. As one example illustrated by FIG. 8B, PRACH repetition has been configured with parameter prach-ConfigIndex equaling 25, preamble format B4, any SFN, slot numbers $\{0, 2, 4, 6, 8\}$, number of repetitions=4, starting subframe periodicity=8, and starting subframe offset=2.

Figure 9:
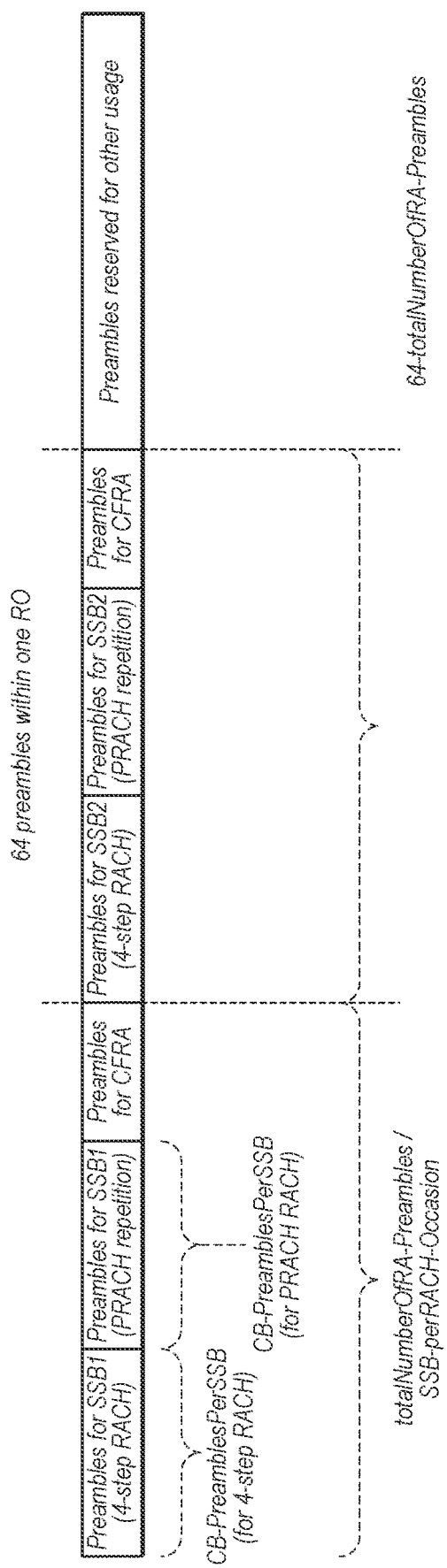
FIG. 9 illustrates an example RO and associated random access channel (RACH) preambles, according to some embodiments.

FIG. 9—Random Access Channel (RACH) Occasion and Associated Preambles

FIG. 9 illustrates an example RO and associated random access channel (RACH) preambles, according to some embodiments. More specifically, FIG. 9 illustrates an example of preamble allocation for repetition in which the RO is shared between contention based 4-step RACH and PRACH repetition. FIG. 9 also illustrates that two SSBs may be mapped into one RO according to the preamble allocation for PRACH repetition.

According to some embodiments and illustrated by FIG. 9, an example RO may include 64 preambles. For example, FIG. 9 illustrates an RO containing preambles for SSB1 corresponding to a contention based (CB) 4-step RACH procedure, preambles for SSB1 corresponding PRACH repetition, and preambles for contention free RACH (CFRA). Additionally, FIG. 9 illustrates that the same RO may contain preambles for SSB2 corresponding to a contention based (CB) 4-step RACH procedure, preambles for SSB2 corresponding PRACH repetition, additional preambles for contention free RACH (CFRA), and preambles reserved for other usage for a total of 64 preambles in one RO. Accordingly, for PRACH repetition, FIG. 9 illustrates how preambles may be allocated such that two SSBs may be mapped into one RO.

For example, for a UE operating in the RRC_CONNECTED state, the preamble used for PRACH repetition (e.g., ra-PreambleIndex) may be provided by PDCCH order such that the RACH occasion used for repetition is indicated by parameter ra-ssb-OccasionMaskIndex. Accordingly, the preamble repetition number of ra-PreambleIndex may be determined such that the repetition number is the same as contention based PRACH repetition, according to some embodiments. Additionally or alternatively, the repetition number may be provided by a contention free random access (CFRA) configuration.

According to some embodiments, a UE may support a PRACH frequency hopping capability characterized by a frequency hopping time interval or frequency hopping pattern for PRACH transmissions. For example, the UE may be configured to support PRACH frequency hopping patterns or intervals based on a per-slot, per-subframe, per-radio frame, or per-half-PRACH repetition basis. Additionally or alternatively, the UE may be configured to support PRACH frequency hopping patterns or intervals based on a combination of per-slot, per-subframe, per-radio frame, and per-half-PRACH repetition basis In some embodiments, the hopping frequency offset for a UE supporting PRACH frequency hopping between two frequency locations may be determined according to the frequency hopping being in a configured PRACH frequency region. For example, a number of PRACH transmission occasions frequency division multiplexed (FDM) in one time instance or period may be msg1-FDM and further characterized by the parameter $n_{RA}=\{1, 2, 4, 8\}$. Additionally or alternatively, $N_{RB}^{RA}$ may be characterized as the PRACH allocation expressed in number of resource blocks (RBs) for a physical uplink shared channel (PUSCH). According to some embodiments, the msg1-frequencyStart may be the lowest PRACH transmission occasion in the frequency domain with respect to the lowest RB of the bandwidth part (BWP) and may be characterized by the parameter $n_{RA}^{start}$. Accordingly, for a subframe, radio frame, or slot i: if i=0, $RB_{start}=n_{RA}^{start}+N_{RB}^{RA}*k$ where k=0, 1, 2, ... $n_{RA}-1$. Additionally or alternatively if $$i = 1, RB_{start} = \left(n_{RA}^{start} + N_{RB}^{RA}*k + N_{RB}^{RA}*\frac{n_{RA}}{2}\right) \mod\left(N_{RB}^{RA}*n_{RA}\right)$$

where k=0, 1, 2, ... $n_{RA}-1$.

According to some embodiments, the hopping frequency offset for a UE supporting PRACH frequency hopping between two frequency locations may be determined according to the frequency hopping being in a configured bandwidth part (BWP). Accordingly, for a subframe, radio frame, or slot is i: if i=0, $RB_{start}=n_{RA}^{start}+N_{RB}^{RA}*k$ where k=0, 1, 2, ... $n_{RA}-1$. Additionally or alternatively, if i=1, $RB_{start}=(n_{RA}^{start}+N_{RB}^{RA}*k+RBoffset) \mod(N_{NWP}^{size})$ where k=0, 1,2, ... $n_{RA}-1$, NZ, is the size of the BWP, and $RB_{offset}$ may be characterized as $$RB_{offset} = \frac{N_{BWP}^{size}}{2}$$

or be configured by the network.

According to some embodiments involving PRACH repetition and frequency hopping, the UE may determine the random access response (RAR) window. In some embodiments, the UE may start the ra-Response Window parameter at the first PDCCH occasion from the end of the last random access preamble transmission in the repetition. Accordingly, the random access—radio network temporary identifier (RA-RNTI) may be determined according each repetition. More specifically, the UE may attempt to use different RA-RNTIs from the first preamble transmission to the last preamble transmission in order to detect a RAR message. Accordingly, once the RAR has been detected, the UE may stop monitoring the RAR. Additionally or alternatively, the UE may start the ra-Response Window parameter at the first PDCCH occasion from the end of the first random access preamble transmission in the repetition. Accordingly, the RA-RNTI may be determined according to last preamble transmission In some embodiments involving PRACH frequency hopping, the UE may determine the RA-RNTI by applying an identifier such as f_id to the respective PRACH occasion before the frequency hopping is initiated. Accordingly, the RA-RNTI may be calculated as RA-RNTI=$1+s_{id}+14*t_{id}+14*80*f_{id}+14*80*8* ul_{carrier_{id}}$ where $f_{id}$ is the index of PRACH occasion in the frequency domain wherein $0 \leq f_{id} < 8$, $s_{id}$ is the index of the first OFDM symbol of the PRACH occasion wherein $0 \leq s_{id} < 14$, and $t_{id}$ is the index of the first slot of the PRACH occasion in a system frame wherein $0 \leq t_{id} < 80$ and the subcarrier spacing configuration μ has a configured value used to determine $t_{id}$.

Figure 10:
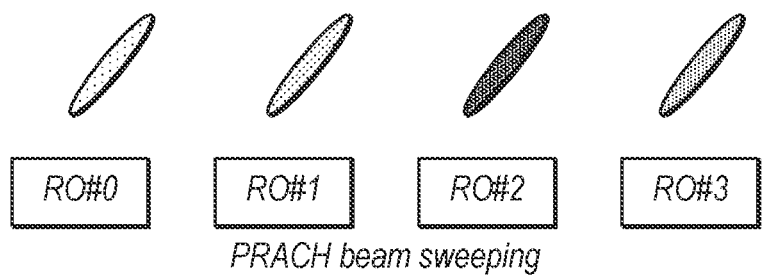
FIG. 10 illustrates an example of PRACH beam sweeping across multiple ROs, according to some embodiments.

FIG. 10—PRACH Beam Sweeping for Multiple ROs

FIG. 10 illustrates an example of PRACH beam sweeping across multiple ROs, according to some embodiments. More specifically, FIG. 10 illustrates RO #0, RO #1, RO #2, and RO #3 which may correspond to different UL beams. As one example, when a UE performs beam sweeping as part of a RACH procedure, the UE may perform SSB RSRP measurements and determine that RO#2 and its associated beam has the strongest or highest RSRP signal. Accordingly, the number of beams to be swept may be determined by the uplink (UL) beam associated with the strongest measured SSB RSRP (e.g., RO#2) as well as two additional beams associated with RO#2's neighboring SSBs. In other words, if the UE determines that RO#2 has the strongest RSRP, it may sweep the beams associated with RO#2 in addition to neighbors RO#1 and RO#3.

According to some embodiments, a RSPR threshold may be configured for PRACH beam sweeping. For example, if the UE measured SSB RSRP is lower than the threshold, the UE may select the PRACH resources for repetition. In other words, the UE may use the threshold to determine the strongest beam and its closest neighboring beams to perform the PRACH. Additionally or alternatively, the UE may determine that all UL beams are to be swept for the multiple ROs associated with the PRACH(s).

Accordingly, the PRACH may be repeated for the same SSB in a time division multiplexing (TDM) manner such that the PRACH resource partition is according to a SSB-RO association. In some embodiments, the SSB-RO association may be characterized by a one to multiple mapping between SSB and RO such that preambles in one RO may be assigned for PRACH beam sweeping and the RO can be shared or configured as a dedicated preamble. Additionally or alternatively, the SSB-RO association may be characterized by a multiple to one mapping between SSB and RO such the beam is swept in an association period, an association pattern period (e.g., 160 milliseconds). In some embodiments, PRACH beam sweeping may not be allowed and/or performed in a multiple to one mapping between an SSB and RO.

According to some embodiments involving PRACH beam sweeping, the UE may determine the random access response (RAR) window. For example, the UE may start the ra-ResponseWindow at the first PDCCH occasion from the end of the last random access preamble transmission in the repetition. Moreover, the RA-RNTI may be determined according to each beam swept in a different time instance. In other words, the UE may utilize different RA-RNTIs from the first preamble transmission to the last preamble transmission to detect the RAR message. Since only one RAR may be expected to be received by the UE via the specific RA-RNTI, the UE may be able to determine the strongest SSB and associated UL beam via the RA-RNTI.

Similarly to PRACH repetition and frequency hopping discussed above, the RA-RNTI may be calculated as RA−RNTI=$1+s_{id}+14*t_{id}+14*80*f_{id}+14*80*8ul_{carrier_{id}}$ where $f_{id}$ where lid is the index of PRACH occasion in the frequency domain wherein $0 \leq f_{id} < 8$ and $t_{id}$ is the index of the first slot of the PRACH occasion in a system frame wherein $0 \leq t_{id} < 80$ and the subcarrier spacing configuration μ has a configured value used to determine $t_{id}$.

ADDITIONAL INFORMATION

According to some embodiments, for PRACH repetition, frequency hopping, and beam sweeping as described above, MsgA repetition for a 2-step RACH procedure may be characterized such that the Msg A includes the MagA preamble and MagA PUSCH. Accordingly, the MsgA preamble and MsgA PUSCH may perform repetition separately. For example, the number of MsgA preambles may be configured separately from the number of MsgA PUSCH repetitions. Accordingly, the MsgA preamble may only be transmitted in PRACH occasions and the offset between the first Msg PUSCH and the last MsgA preamble may be configured by the network, according to some embodiments.

In some embodiments, frequency hopping may be separately configured for the MsgA preamble(s) and MsgA PUSCH(s). For example, MsgA PUSCH repetition maybe configured with Type A PUSCH repetition or Type B PUSCH repetition. In some embodiments, if a MsgA PUSCH collides with another UL transmission or downlink DL reception, the UE may be configured such that existing configured grant (CG) or dynamic grant (DG) PUSCH collision dropping may be re-used for MsgA PUSCH repetition. Additionally or alternatively, other MsgA PUSCH configurations for repetition may re-use existing MsgA PUSCH configuration for a 2-step RACH procedure.

According to some embodiments, for PRACH repetition, frequency hopping, and beam sweeping as described above, MsgA repetition for a 2-step RACH procedure may be characterized such that the MsgA is characterized as a whole channel structure to perform repetition. For example, the repetition number of MsgA preambles and MsgA PUSCH(s) may be configured together such that the MsgA preamble repetition is only transmitted in PRACH occasions. Moreover, if a MsgA PUSCH experiences a collision with another UL transmission, that MsgA PUSCH may be dropped, according to some embodiments.

Note that while various embodiments described herein may relate to 5G/NR, they may be extended to any set of wireless communication, including LTE, GSM, CDMA, etc.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   transmitting, to a base station (BS), a message comprising information regarding one or more physical random access channel (PRACH) repetition capabilities of a user equipment (UE);
   receiving, from the BS, signaling comprising PRACH configuration information configuring one or more reference signal received power (RSRP) thresholds;
   selecting, based at least in part on the one or more RSRP thresholds, one or more PRACH resources for one or more PRACH repetitions;
   transmitting, using the one or more PRACH resources and as part of the one or more PRACH repetitions, one or more preambles to the BS in a random access (RACH) procedure;
   receiving, from the BS, a random access response (RAR); and
   establishing, in response to receiving the RAR, a connection with the BS.

2. The method of claim 1, wherein the information is further regarding one or more other PRACH capabilities comprising at least one of:
   PRACH frequency hopping; or
   PRACH beam sweeping.

3. The method of claim 1, further comprising:
   configuring the one or more preambles in a RACH occasion (RO) or a dedicated RO for PRACH repetition or PRACH beam sweeping.

4. The method of claim 1, wherein there is a one to multiple or multiple to one mapping between synchronization signal blocks (SSBs) and RACH occasions (ROs).

5. The method of claim 1, wherein the one or more preambles are transmitted at a maximum power level or at increasing power levels.

6. The method of claim 1, wherein a starting subframe periodicity of the one or more preambles is greater than or equal to a number of the one or more preambles.

7. The method of claim 1, wherein a frequency hopping offset corresponding to at least one of a configured frequency region and configured bandwidth part (BWP) is indicated in the one or more preambles.

8. The method of claim 1, further comprising:
   determining a RAR window using one or more random access-radio network temporary identifiers (RA-RNTIs).

9. The method of claim 1, further comprising:
   determining a number of beams to be swept based on one or more synchronization signal block (SSB) RSRP measurements.

10. The method of claim 1, wherein there is a multiple to one mapping between synchronization signal blocks (SSBs) and RACH occasions (ROs), and wherein one or more beams are swept in an associated period or an associated pattern period.

11. The method of claim 1, wherein a first message (MsgA) comprises the one or more preambles and one or more physical uplink shared channel (PUSCH) transmissions which are configured separately for the one or more PRACH repetition capabilities.

12. A method, comprising:
   receiving, from a user equipment (UE), a message comprising information regarding one or more physical random access channel (PRACH) repetition capabilities of the UE;
   transmitting, to the UE, signaling comprising PRACH configuration information configuring one or more reference signal received power (RSRP) thresholds;
   receiving, from the UE, one or more preambles in a random access (RACH) procedure, wherein the one or more preambles are transmitted by the UE using one or more PRACH resources and as part of one or more PRACH repetitions, and wherein the one or more PRACH resources for the one or more PRACH repetitions are selected by the UE based at least in part on the one or more RSRP thresholds;
   transmitting, to the UE, a random access response (RAR); and
   establishing a connection with the UE.

13. The method of claim 12, wherein a frequency hopping time interval or pattern is configured based on at least one of:
   a per-slot basis;
   a per-subframe basis;
   a per-radio frame basis; or
   a per-half PRACH repetition basis.

14. The method of claim 12, wherein the signaling comprises an indication of one or more configured PRACH formats comprising PRACH format B4.

15. The method of claim 12, wherein a predefined number of PRACH repetitions is indicated by a system information block (SIB).

16. The method of claim 12, wherein a first message (MsgA) comprises the one or more preambles and one or more physical uplink shared channel (PUSCH) transmissions, and wherein an offset between a first MsgA PUSCH of the one or more PUSCH transmissions and a last MsgA preamble of the one or more preambles is configured by a base station.

17. The method of claim 12, wherein a first message (MsgA) comprises the one or more preambles and one or more physical uplink shared channel (PUSCH) transmissions, and wherein the first MsgA is transmitted as a whole channel structure.

18. An apparatus, comprising:
   at least one processor configured to cause a user equipment (UE) to:
   transmit, to a base station (BS), a message comprising information regarding one or more physical random access channel (PRACH) repetition capabilities of the UE;
   receive, from the BS, signaling comprising PRACH configuration information configuring one or more reference signal received power (RSRP) thresholds;
   select, based at least in part on the one or more RSRP thresholds, one or more PRACH resources for one or more PRACH repetitions;
   transmit, using the one or more PRACH resources and as part of the one or more PRACH repetitions, one or more preambles to the BS in a random access (RACH) procedure;
   receive, from the BS, a random access response (RAR); and
   establish, in response to receiving the RAR, a connection with the BS.

19. The apparatus of claim 18, further comprising a radio operably coupled to the at least one processor.

20. The apparatus of claim 18, wherein the information is further regarding one or more other PRACH capabilities comprising at least one of:
  PRACH frequency hopping; or
  PRACH beam sweeping.

\* \* \* \* \*